US006781639B2

(12) United States Patent
Nozawa et al.

(10) Patent No.: US 6,781,639 B2
(45) Date of Patent: Aug. 24, 2004

(54) DEFLECTION YOKE

(75) Inventors: Takahiro Nozawa, Ryugasaki (JP); Manabu Asayama, Oyama (JP)

(73) Assignee: Victor Company of Japan, Ltd. (JP)

( * ) Notice: Subject to any disclaimer, the term of this patent is extended or adjusted under 35 U.S.C. 154(b) by 395 days.

(21) Appl. No.: 09/796,356

(22) Filed: Mar. 2, 2001

(65) Prior Publication Data

US 2001/0024243 A1 Sep. 27, 2001

(30) Foreign Application Priority Data

Mar. 6, 2000 (JP) ....................................... 2000-060013
Sep. 12, 2000 (JP) ....................................... 2000-276124

(51) Int. Cl.[7] ........................... H04N 5/655; H01H 1/00
(52) U.S. Cl. ........................ 348/829; 335/213; 313/440
(58) Field of Search ................................ 348/829, 830, 348/805, 806, 807; 313/440, 412, 421, 428, 433, 437, 430; 335/210, 212, 213; 315/370; H04N 5/655

(56) References Cited

U.S. PATENT DOCUMENTS

| | | | | | |
|---|---|---|---|---|---|
| 4,754,190 | A | * | 6/1988 | Hinotami et al. | 313/422 |
| 4,789,806 | A | * | 12/1988 | Meershoek | 313/440 |
| 5,378,961 | A | * | 1/1995 | Shiro et al. | 313/440 |
| 5,446,432 | A | * | 8/1995 | Ikeuchi | 335/213 |
| 5,838,099 | A | * | 11/1998 | Hichiwa et al. | 313/440 |

* cited by examiner

*Primary Examiner*—Michael H. Lee
(74) *Attorney, Agent, or Firm*—Connolly Bove Lodge & Hutz LLP

(57) ABSTRACT

Each horizontal deflection coil 2 comprises the smaller diameter flange 2A. A width "b" of the smaller diameter flange 2A in the horizontal direction of a screen of a color picture tube is more than twice a height "a" of the smaller diameter flange 2A in the vertical direction of the screen.

1 Claim, 4 Drawing Sheets

DEFLECTION YOKE

BACKGROUND OF THE INVENTION

1. Field of the Invention

The present invention relates to a deflection yoke utilized for a picture displaying apparatus such as a television receiver and a displaying device, which is equipped with a color picture tube, particularly, relates to a deflection yoke being improved on a saddle shaped horizontal deflection coil.

2. Description of the Related Art

In a picture displaying apparatus utilizing a color picture tube of an inline three electron gun type, there existed one method, which utilizes a deflection yoke of self-convergence system, out of several methods for converging three electron beams emitted from three electron guns on a screen or a picture excellently. Such a deflection yoke of self-convergence system is usually composed of a pair of upper and lower saddle shaped horizontal deflection coils and a pair of right and left saddle shaped vertical deflection coils, and then an excellent convergence characteristic can be obtained.

However, a deflection yoke, which was generally mass-produced, generates miss-convergence by reason of scattering of a characteristic of a horizontal or vertical deflection coil and by reason of shifting of a coil allocation when the coil is installed. Accordingly, convergence of almost all deflection coils is adjusted by installing a magnetic piece on an adequate position of a coil, or compensated by a correction circuit.

FIGS. 5(*a*) and 5(*b*) show statuses of horizontal deflection magnetic fields unbalanced in right and left.

FIGS. 6(*a*) and 6(*b*) show miss-convergence patterns, which generate when a magnetic field is in the statuses shown in FIGS. 5(*a*) and 5(*b*). Further, FIGS. 5(*a*) and 5(*b*) are cross sectional views of a neck portion 100 of a color picture tube with viewing from a screen side of the color picture tube. In FIGS. 5(*a*) and 5(*b*), circled letters "R", "G", and "B" represent a cross section of an electron beam of red, green, and blue respectively, curves in a broken line represent magnetic fields, and an arrow "X" represents the horizontal direction of the screen. In FIGS. 6(*a*) and 6(*b*), letters "R" and "B" show bright lines drawn by the "R" and "B" electron beams respectively.

As shown in FIG. 5(*a*), when a distribution of horizontal deflection magnetic field is unbalanced in right and left, in other words, when a pin cushion of magnetic field for the "R" beam is strengthened and a pin cushion of magnetic field for the "B" beam is weakened, a miss-convergence happens such that a bright line of the "R" shown in a solid line is allocated outside a bright line of the "B" shown in a broken line in both the edge areas of the screen in the horizontal direction as shown in FIG. 6(*a*). On the other hand, as shown in FIG. 5(*b*), when a pin cushion of magnetic field for the "R" beam is weakened and a pin cushion of magnetic field for the "B" beam is strengthened, a miss-convergence happens such that a bright line of the "R" shown in a solid line is allocated inside a bright line of the "B" shown in a broken line in both the edge areas of the screen in the horizontal direction as shown in FIG. 6(*b*). Such a miss-convergence is called an H-shift miss-convergence.

FIG. 7 is a perspective view of a deflection coil utilized for a deflection yoke of the prior art.

In order to compensate such the miss-convergence mentioned above in a deflection yoke, as shown in FIG. 7, a magnetic piece 26 is allocated on an end surface (toward an electron gun) of each smaller diameter flange 20A (toward an end of neck of a color picture tube) of each horizontal deflection coils 20. It is not mentioned that the magnetic piece 26 is directly adhered on the end surface of each small diameter flange 2A. Generally, the magnetic piece 26 is mounted on a separator. In a case that a magnetic field affecting the "R" beam is strong as shown in FIG. 5(*a*), the magnetic piece 26 is allocated on the left side of the end surface of the smaller diameter flange 20A with viewing from the smaller diameter flange 20A side as shown in FIG. 7. The magnetic piece 26 is magnetized by a magnetic field generated by the smaller diameter flange 20A. Accordingly, the magnetic piece 26 generates a magnetic field of compensating the H-shift miss-convergence.

With referring to FIG. 8, an effect of the magnetic piece 26 will be explained. FIG. 8 is a cross sectional view of a neck portion 100 of a color picture tube with viewing from a screen side of the color picture tube. In FIG. 8, circled letters "R", "G", and "B" represent a cross section of an electron beam of red, green, and blue respectively, curves in a broken line represent magnetic fields, and an arrows "X" and "Y" represent the horizontal direction and the vertical direction of the screen respectively. In a case of being deflected toward the left side of the screen, for example, a direction of current flowing through the smaller diameter flange 20A of the horizontal deflection coil 20 is shown by an arrow 210. The magnetic piece 26, which is allocated closer to the electron gun than the smaller diameter flange 20A, is magnetized with being oriented to an arrow 230 by a magnetic field generated by the smaller diameter flange 20A within a range of broken line 220.

A magnetic field generated by the magnetic piece 26, as a result of being magnetized, is oriented toward a direction of canceling a main deflection magnetic field generated by the horizontal deflection coil 20, that is, toward a direction of weakening the magnetic field in the right side of the neck portion 100 and unbalanced magnetic field in right and left is solved. Accordingly, the magnetic piece 26 is magnetized by the magnetic field in the "Y" direction generated by the smaller diameter flange 20A, and then the H-shift miss-convergence is compensated by the magnetic field generated by the magnetic piece 26 being magnetized.

A degree of influence on a convergence characteristic caused by variations of the horizontal deflection coil 20 and dislocation of the horizontal deflection coil 20 during installation is increasing in response to recent trend toward a larger screen of a displaying device. Further, demand for decreasing a deflection power of a deflection yoke is increasing for the purpose of power saving of a displaying device. In order to match the trend and demand, as disclosed in the Japanese Patent Laid-open Publication No. 8-153477, for example, the smaller diameter flange 20A of the horizontal deflection coil 20 tends to be miniaturized. The magnetic field of the smaller diameter flange 20A, which magnetizes the magnetic piece 26, decreases as a result of a miniaturized smaller diameter flange. Accordingly, an effect of compensating the H-shift miss-convergence is deteriorated.

In order to increase the effect of compensating the H-shift miss-convergence, dimensions of the magnetic piece 26 shall be enlarged. However, the magnetic piece 26 is generally made of formed ferrite, so that a manufacturing cost of the magnetic piece 26 increases if the dimension is enlarged. Further, since a coil for compensating coma is mounted on a smaller diameter flange of a separator for a deflection yoke and some components such as a fastening band for fastening a cylindrical neck portion provided on the smaller diameter flange to a neck portion of a color picture tube are mounted on the cylindrical neck portion, enlarging the dimensions of the magnetic piece 26 is inevitably limited by a mounting construction and a mounting allocation.

SUMMARY OF THE INVENTION

Accordingly, in consideration of the above-mentioned problems of the prior art, an object of the present invention is to provide a deflection yoke, which can effectively compensate the H-shift miss-convergence without enlarging dimensions of a magnetic piece for compensating the H-shift miss-convergence.

In order to achieve the above object, the present invention provides, according to an aspect thereof, a deflection yoke being mounted on a neck portion of a color picture tube comprising a pair of horizontal deflection coils, which are composed of a smaller diameter side toward the neck portion and a larger diameter side toward a screen side of the color picture tube, having a flange on the smaller diameter side, wherein a width of the flange in a horizontal direction of the screen is more than twice a height of the flange in a vertical direction of the screen.

Other objects and further features of the present invention will be apparent from the following detailed description when read in conjunction with the accompanying drawings.

DETAILED DESCRIPTION OF THE PREFERRED EMBODIMENTS

[Embodiment]

Figure 1:
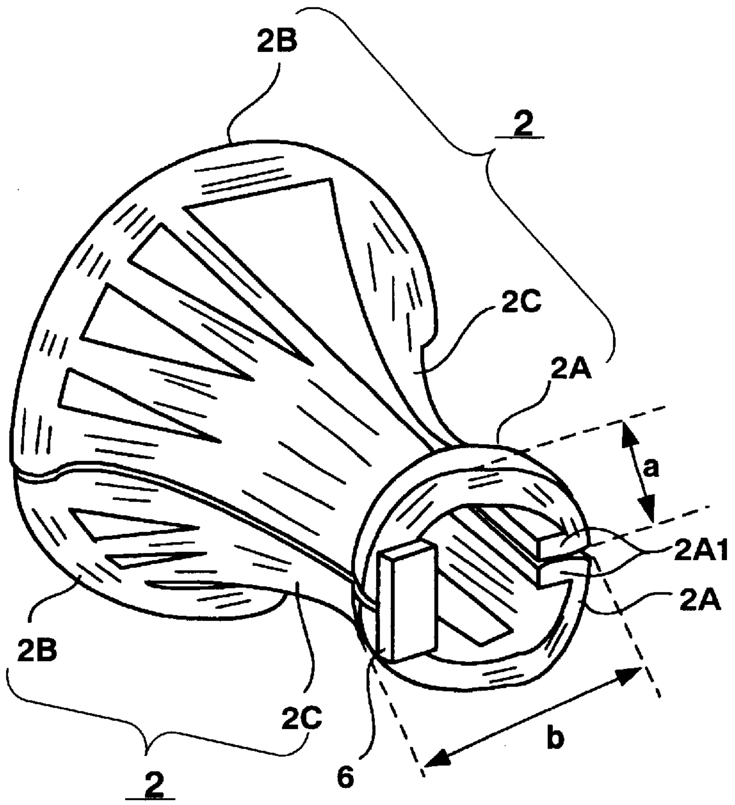
FIG. 1 is a perspective view of a deflection coil utilized for a deflection yoke according to an embodiment of the present invention.
Figure 3:
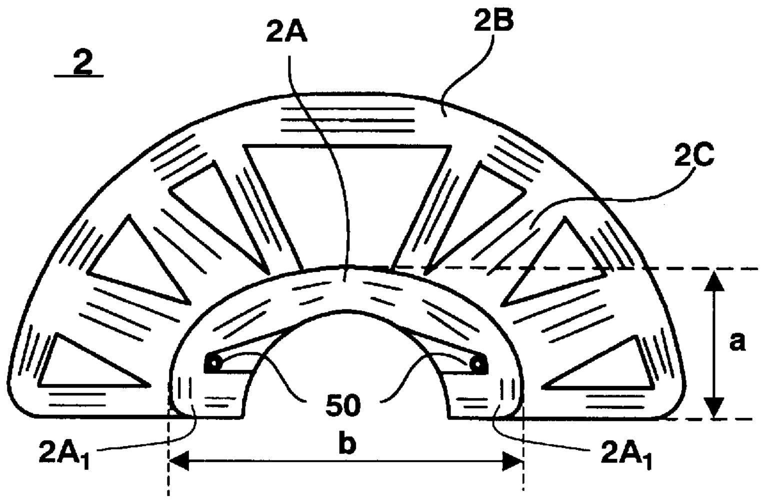
FIG. 3 is a plan view of the horizontal deflection coil shown in FIG. 1.
Figure 2:
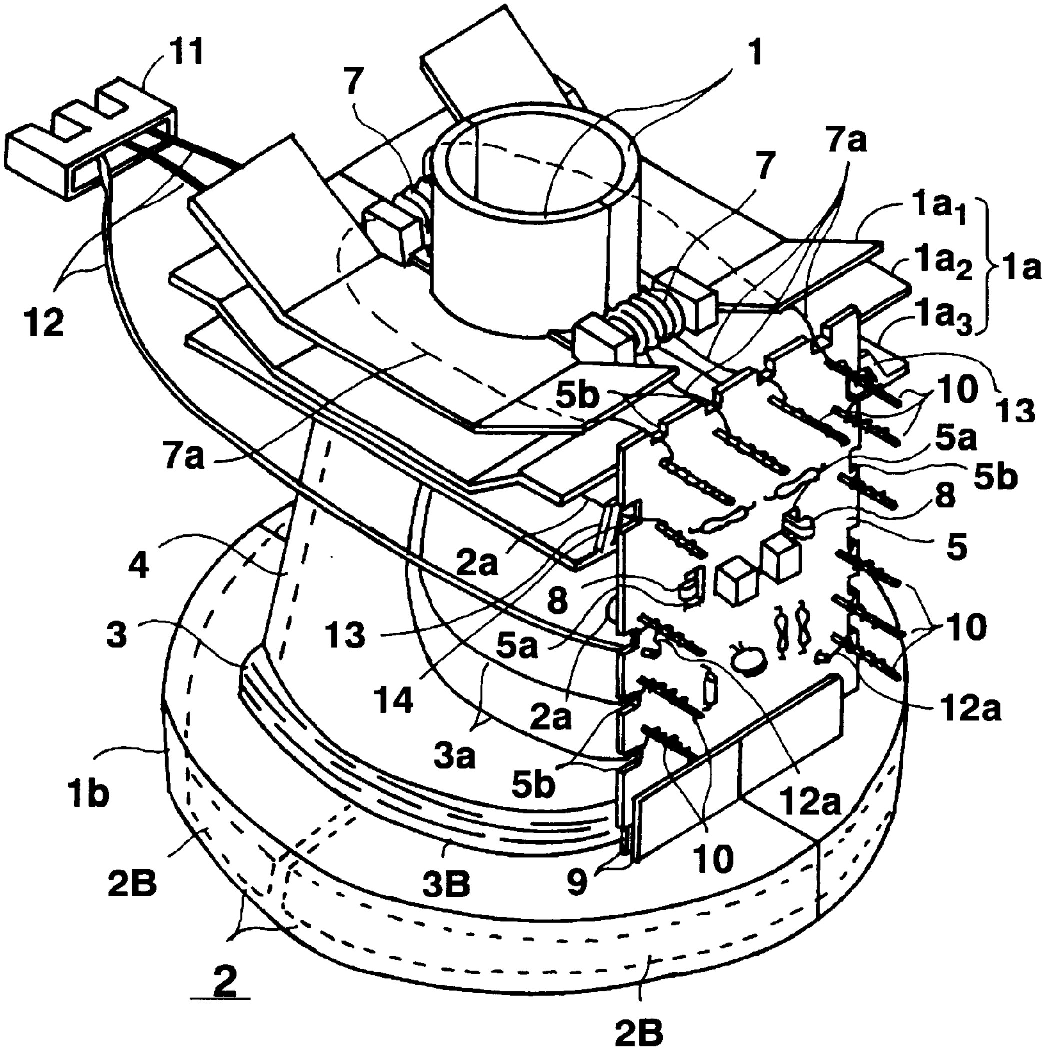
FIG. 2 is a perspective view of a total construction of the deflection yoke according to the embodiment of the present invention.
Figure 4:
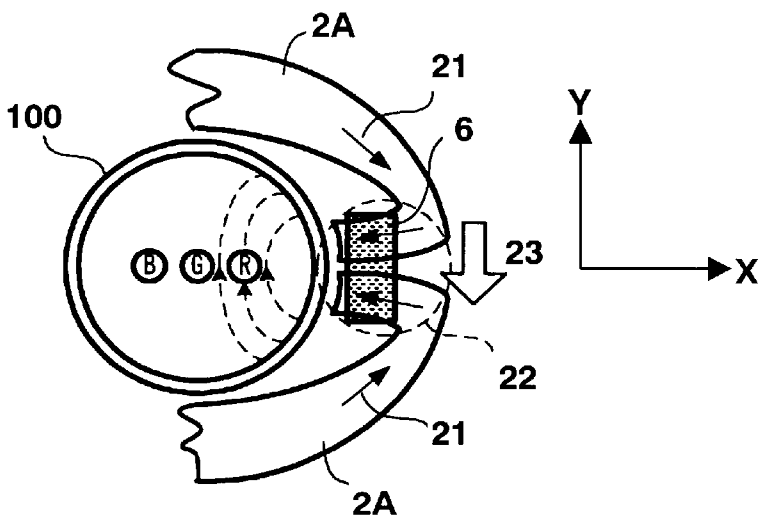
FIG. 4 is a cross sectional view of neck portions of a color picture tube and horizontal deflection coils of the present invention so as to explain an effect of the horizontal deflection coils.
Figure 5A:
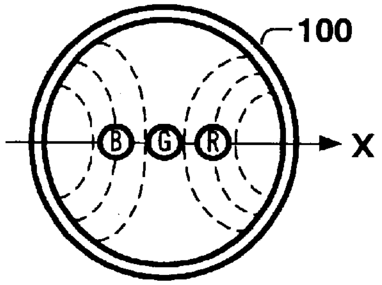
FIGS. 5(*a*) and 5(*b*) show statuses of horizontal deflection magnetic fields unbalanced in right and left.
Figure 5B:
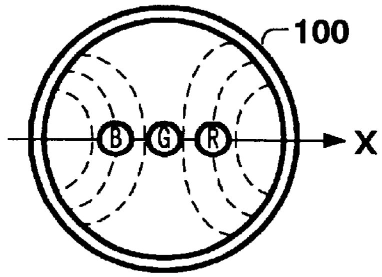
Figure 6A:
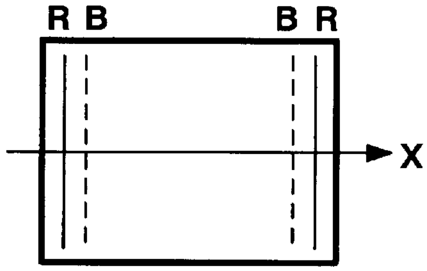
FIGS. 6(*a*) and 6(*b*) show H-shift miss-convergence patterns.
Figure 6B:
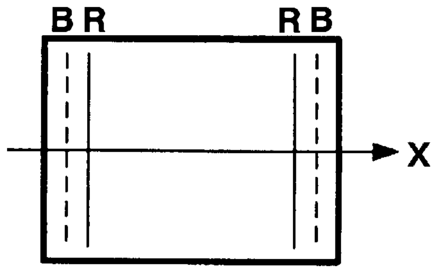

With referring to accompanying drawings, a deflection yoke of the present invention is depicted. FIG. 1 is a perspective view of a deflection coil utilized for a deflection yoke according to an embodiment of the present invention. FIG. 2 is a perspective view of a total construction of the deflection yoke. FIG. 3 is a plan view of the horizontal deflection coil shown in FIG. 1. FIG. 4 is a cross sectional view of neck portions of a color picture tube and horizontal deflection coils of the present invention so as to explain an effect of the horizontal deflection coils. In FIG. 1, a horizontal deflection coil 2 comprises a flange in a smaller diameter or a smaller diameter flange 2A, another flange in a larger diameter or a larger diameter flange 2B, and a side section 2C connecting between the smaller diameter flange 2A and the larger diameter flange 2B. The smaller diameter flange 2A is further provided with a crooked section $2A_1$ on both ends in the horizontal direction. The smaller diameter flange 2A has a height of "a" and a width of "b". A magnetic piece 6 is allocated on an end surface of the smaller diameter flange 2A.

With referring to FIG. 2, a total construction of the deflection yoke of the present invention is depicted first. An example of total construction shown in FIG. 2 includes some components, which are not directly related to the present invention. The deflection yoke of the present invention is not limited to the one shown in FIG. 2. In FIG. 2, the deflection yoke is formed like a funnel shape such that one end toward the top is a smaller diameter section and the other end toward bottom is a larger diameter section by means of a separator 1, which is combined with, for example, a pair of semi-annular members, wherein the smaller diameter section is allocated toward a neck portion of a color picture tube and the larger diameter section toward a screen side.

A pair of horizontal deflection coils 2 in a saddle shape is mounted on an inner surface of the separators 1 and a pair of vertical deflection coils 3 in a saddle shape is mounted on an outer surface of the separators 1. The separators 1 hold the horizontal and vertical deflection coils 2 and 3 with electrically insulated. A core 4 of magnetic material such as ferrite is mounted on an outer surface of the vertical deflection coils 3. The deflection yoke of the present invention is characterized in a construction of the horizontal deflection coil 2.

As mentioned above, the horizontal deflection coil 2 is provided with the smaller diameter flange 2A (not shown in FIG. 2) toward an end of neck portion of a color picture tube and the larger diameter flange 2B toward the screen side of the color picture tube. In FIG. 2, the smaller diameter flange 2A is contained in a container section (not shown) provided on a smaller diameter side of the separator 1 and the larger diameter flange 2B is contained in a larger diameter side flange 1*b* of the separator 1. Further, a vertical deflection coil 3 is also provided with a smaller diameter side flange (not shown) and a larger diameter side flange 3B.

Usually a circuit for compensating a deflection characteristic is necessary for such the deflection yoke constituted as mentioned above. A circuit board 5 equipped with such the circuit is mounted on a side of the separator 1. A smaller diameter side flange 1*a* composed of a plurality of flanges $1a_1$, $1a_2$, and $1a_3$ is provided on the smaller diameter side of the separator 1. A pair of four pole compensating coil 7, called a 4P coil, is fixed on the outermost flange $1a_1$ of the smaller diameter side flange 1*a*.

A craw 8 for mounting the circuit board 5 on the separator 1 is formed in conjunction with the innermost flange $1a_3$. The circuit board 5 is provided with a hole 5*a* and the craw 8 provided on the innermost flange $1a_3$ is engaged with the hole 8. On the other hand, a pair of board like ribs 9 is provided on the larger diameter side flange 1*b* formed in conjunction with the larger diameter side flange 1*b*. The circuit board 5 is held with being engaged with the ribs 9. Accordingly, the circuit board 5 is mounted on the side of the separator 1 by means of the craw 8 provided on the innermost flange $1a_3$ and the ribs 9.

Further, a plurality of pins 10 as a terminal for connecting a lead wire is mounted on the circuit board 5 and twined with a lead wire 2*a* from the horizontal deflection coil 2, a lead wire 3*a* from the vertical deflection coil 3, and a lead wire $7a$ from the compensating coil 7. Furthermore, a connector 11, which is connected to a power supply so as to supply current to the deflection yoke, is connected with connector wires 12. A lead wire 12*a* of the connector wires 12 is twined with the pin 12 on the circuit board 5.

A plurality of grooves 5*b* for passing the lead wires 2*a*, 3*a* , and 7*a* is provided on both edges of the circuit board 5. The lead wires 2*a*, 3*a*, and 7*a* led to the circuit board 5 are contained in the respective grooves 5*b* and twined with respective pins 10 and soldered. However, solder itself is not shown in FIG. 2. An L-shaped rib 13 is provided with being formed in conjunction with the innermost flange $1a_3$. The lead wire 2*a* from the horizontal deflection coil 2 is contained in the groove 5*b* through a C-shaped concave section 14, which is formed by the rib 13 and the innermost flange $1a_3$.

A construction of the horizontal deflection coil 2, which is a main component of the deflection yoke of the present invention, is depicted next. In FIG. 1, one pair of each horizontal deflection coil 2 is composed of an upper and a lower horizontal deflection coils. The horizontal deflection coil 2 is provided with the smaller and larger diameter flanges 2A and 2B, which are folded in parallel to a screen of a color picture tube. The upper and lower represent the vertical direction of the screen (hereinafter referred to an Y-direction) when the deflection yoke is mounted on a neck portion of the color picture tube. The side section 2C connecting between the smaller diameter flange 2A and the larger diameter flange 2B constitutes a funnel shaped surface. The smaller diameter flange 2A is formed like approximately a circular arc or a convex shape. The crooked section $2A_1$, which is folded inward approximately in parallel to the horizontal direction of the screen (hereinafter referred to a X-direction) or toward the radial direction of the neck portion of the color picture tube, is provided on both ends of the smaller diameter flange 2A in a vicinity of a face of confronting the upper and lower horizontal deflection coils 2 with each other. With defining that a dimension in the Y-direction of the smaller diameter flange 2A is "a" and a dimension in the X-direction is "b", the dimension "b" is larger than the dimension "a" by more than 2.0.

The horizontal deflection coil 2 can be formed as shown in FIG. 3. A coil, that is, a wire is wound by a winding form of a winding device so as to form the horizontal deflection coil 2. In FIG. 3, when winding a coil, a dividing pin 50 is inserted into the winding form so as to adjust a range and a position of winding a coil. By extending the dividing pin 50, which decides a winding range of the smaller diameter flange 2A, to the right and left directions, the crooked section $2A_1$ is formed and the smaller diameter flange 2 of which the dimension "b" in width is longer than the dimension "a" in height by more than 2.0 is formed in a crosswise shape.

Figure 7:
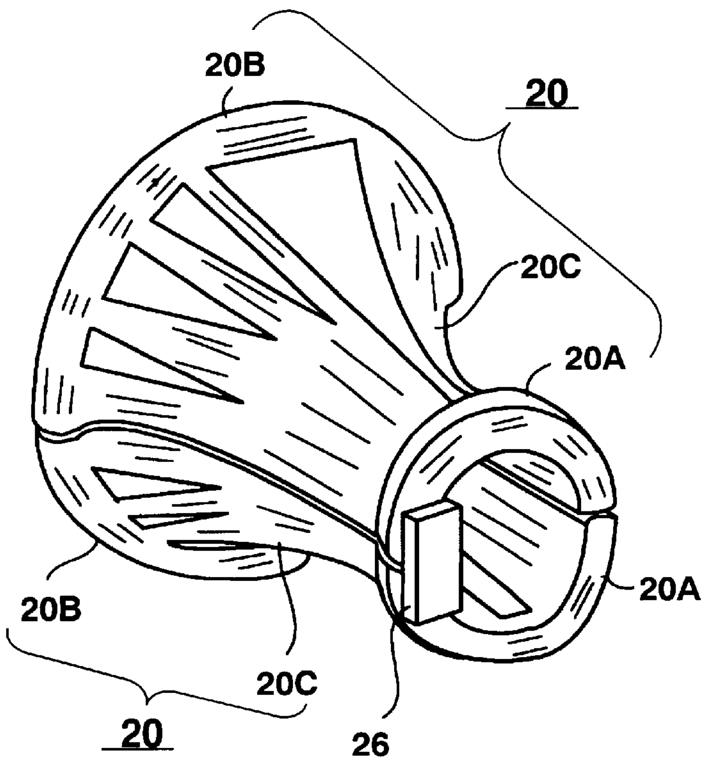
Fig. 7 Prior Art
FIG. 7 is a perspective view of a deflection coil utilized for a deflection yoke of the prior art.
Figure 8:
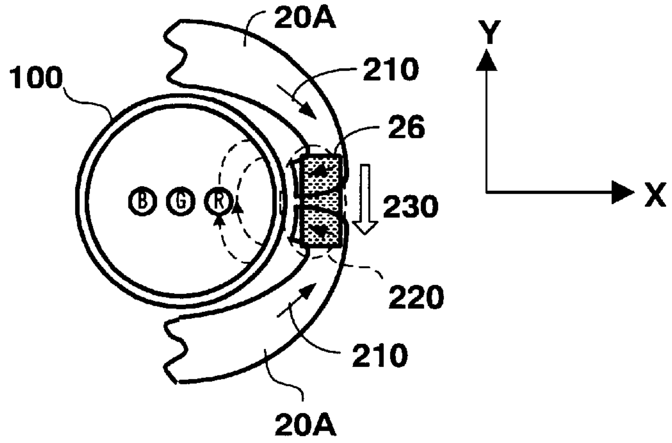
Fig. 8 Prior Art
FIG. 8 is a cross sectional view of neck portions of a color picture tube and horizontal deflection coils of the prior art so as to explain an effect of the horizontal deflection coils.

As mentioned above, the deflection yoke of the present invention is characterized in that the crooked section $2A_1$ can be formed larger than that of the prior art by assigning the dimension "b" in width larger than the dimension "a" in height by more than 2.0. As shown in FIG. 8, the smaller diameter flange 20A of the horizontal deflection coil 20 of the prior art is provided with a crooked section equivalent to the crooked section $2A_1$. However, its length is further shorter than that of the crooked section $2A_1$ of the present invention. In addition thereto, the crooked section is abbreviated in FIG. 7.

With referring to FIG. 4, an effect of the deflection yoke of the present invention is depicted next. FIG. 4 is a cross sectional view of a neck portion 100 of a color picture tube with viewing from a screen side of the color picture tube. In FIG. 4, circled letters "R", "G", and "B" represent a cross section of an electron beam of red, green, and blue respectively, curves in a broken line represent magnetic fields, and an arrows "X" and "Y" represent the horizontal direction (X-direction) and the vertical direction (Y-direction) of the screen respectively. In a case of being deflected toward the left side of the screen, for example, a direction of current flowing through the smaller diameter flange 2A of the horizontal deflection coil 2 is shown by an arrow 21. A magnetic piece 6, which is allocated closer to the electron gun than the smaller diameter flange 2A, is magnetized with being oriented to an arrow 23 by a magnetic field generated by the smaller diameter 2A within a range of broken line 22. In addition thereto, the magnetic piece 6 is mounted on the smaller diameter side flange 1*a* of the separator 1.

The horizontal deflection coil 2 utilized for the deflection yoke of the present invention is provided with the smaller diameter flange 2A in the crosswise shape of which the dimension "b" in width is larger than the dimension "a" in height by more than 2.0 and the crooked section $2A_1$ of which length is larger than that of the prior art, so that a magnetic field within a range shown by the broken line 22 generated by the smaller diameter flange 2A becomes extremely larger than the magnetic field within the range indicated by the broken line 220 shown in FIG. 8. Magnetization in the arrow 23 direction becomes extremely larger than the magnetization in the arrow 230 direction shown in FIG. 8, so that a magnetic field generated by the magnetic piece 6 of the present invention becomes larger than that of the prior art shown in FIG. 8. Accordingly, a compensation amount of the H-shift miss-convergence increases and the H-shift miss-convergence can be effectively compensated.

A relation between a shape of the smaller diameter flange 2A and a compensation amount of the H-shift miss-convergence is depicted next. In Table 1 below, "b/a" represents a ratio of a dimension "b" in width to a dimension "a" in height and "Compensation amount" is a compensation amount of the H-shift miss-convergence at each "b/a" ratio. A unit of a compensation amount is mm. The "Compensation amount" is a compensation amount on a screen confirmed by experiments of using a 17-inch color picture tube. A compensation amount of the H-shift miss-convergence requires at least 0.3 mm. Setting the "b/a" to more than 2.0 satisfies the requirement. More desirably, the "b/a" must be more than 2.1.

TABLE 1

| b/a | 1.8 | 1.9 | 2.0 | 2.1 | 2.2 |
|---|---|---|---|---|---|
| Compensation amount | 0.20 | 0.28 | 0.34 | 0.39 | 0.42 |

In addition thereto, by increasing the "b/a", an amount of compensation can be increased. However, if it is increased more than a necessary amount, a width of the smaller diameter flange 2A becomes larger and the horizontal deflection coil 2 becomes larger thereby. This causes a baneful influence of increasing a manufacturing cost such that a deflection yoke becomes larger and usage of wire to be used for a horizontal deflection coil increases. The baneful influence becomes seriously, if the "b/a" exceeds 4.0, so that the "b/a" is preferable to be less than 4.0 in practice. Accordingly, the "b/a" is desirable to be 2.0 through 4.0.

As mentioned above, by optimizing a shape of the horizontal deflection coil 2 in the deflection yoke of the present invention, a compensation amount of the H-shift miss-convergence can be increased without enlarging a dimension of the magnetic piece 6. Accordingly, the H-shift miss-convergence can be sufficiently and effectively compensated. While the present invention has been described above with reference to specific embodiment thereof, it is apparent that many changes, modifications and variations in the arrangement of components and devices and in materials can be made without departing from the invention concept disclose herein.

According to an aspect of the present invention, there provided a horizontal deflection yoke, which can effectively compensate the H-shift miss-convergence by an effect of setting a width of a smaller diameter flange of a horizontal deflection coil to be more than twice a height of the smaller diameter flange without enlarging a dimension of a magnetic piece for compensating the H-shift miss-convergence.

What is claimed is:

1. A deflection yoke mounted on a neck portion of a color picture tube and comprising:

a pair of horizontal deflection coils having a smaller diameter side toward the neck portion and a larger diameter side toward a screen side of the picture tube, wherein each smaller side of the pair of horizontal deflection coils has a bent portion that is folded inside in the horizontal direction of the screen respectively and the bent portions confront each other;

the smaller diameter side having a flange with a width, which is a distance between apexes of the bent portions, in the horizontal direction of the screen, that is between twice and four times a height of the flange in a vertical direction.

* * * * *